(12) United States Patent
Kondo et al.

(10) Patent No.: US 9,207,436 B2
(45) Date of Patent: *Dec. 8, 2015

(54) IMAGING LENS AND IMAGING APPARATUS INCLUDING THE IMAGING LENS

(71) Applicant: FUJIFILM Corporation, Tokyo (JP)

(72) Inventors: Masato Kondo, Saitama-ken (JP);
Takuya Tanaka, Saitama-ken (JP);
Kazumi Koike, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/184,140

(22) Filed: Feb. 19, 2014

(65) Prior Publication Data

US 2014/0293443 A1 Oct. 2, 2014

(30) Foreign Application Priority Data

Mar. 29, 2013 (JP) ................................. 2013-072270

(51) Int. Cl.
*G02B 3/02* (2006.01)
*G02B 13/18* (2006.01)
*G02B 13/00* (2006.01)

(52) U.S. Cl.
CPC ............ *G02B 13/18* (2013.01); *G02B 13/0045* (2013.01)

(58) Field of Classification Search
CPC ......... G02B 13/18; G02B 13/002; G02B 9/60
USPC .......................................... 359/708, 714, 764
See application file for complete search history.

(56) References Cited

U.S. PATENT DOCUMENTS

| 7,710,665 B2 * | 5/2010 | Park et al. ..................... 359/767 |
| 8,305,697 B1 | 11/2012 | Chen et al. |
| 2011/0013069 A1 * | 1/2011 | Chen ............................. 348/335 |
| 2011/0134305 A1 * | 6/2011 | Sano et al. .................... 348/340 |

FOREIGN PATENT DOCUMENTS

| CN | 201903684 | 7/2011 |
| CN | 202141850 | 2/2012 |

* cited by examiner

*Primary Examiner* — James Greece
(74) *Attorney, Agent, or Firm* — Young & Thompson

(57) ABSTRACT

An imaging lens substantially consists of, in order from an object side, five lenses of a first lens that has a positive refractive power and has a meniscus shape which is concave toward an image side, a second lens that has a negative refractive power and has a meniscus shape which is concave toward the image side, a third lens that has a biconcave shape, a fourth lens that has a positive refractive power and has a meniscus shape which is convex toward the image side, and a fifth lens that has a biconcave shape and has an aspheric shape which has at least one extreme point on an image side surface. Further, the imaging lens satisfies a predetermined conditional expression.

13 Claims, 9 Drawing Sheets

IMAGING LENS AND IMAGING APPARATUS INCLUDING THE IMAGING LENS

BACKGROUND OF THE INVENTION

1. Field of the Invention

The present invention relates to a fixed-focus imaging lens that forms an optical image of a subject on an imaging device, such as a charge coupled device (CCD) and a complementary metal oxide semiconductor (CMOS), and to an imaging apparatus, such as a digital still camera, a cellular phone with a camera, a mobile information terminal (PDA: Personal Digital Assistance), a smartphone, a tablet terminal, and a mobile game machine, on which the imaging lens is mounted to perform photography.

2. Description of the Related Art

As personal computers have become popular in homes, digital still cameras which are capable of inputting image information about photographed scenes, persons, and the like into the personal computers have spread rapidly. Further, a cellular phone, a smartphone, or a tablet terminal in which a camera module for inputting images is installed has been increasing. Such apparatus having an imaging function uses an imaging device, such as a CCD and a CMOS. Recently, because the imaging device has been miniaturized, there has been also a demand to miniaturize the whole of the imaging apparatus and an imaging lens mounted thereon. Further, since the number of pixels included in the imaging device has also been increasing, there has been a demand to enhance the resolution and performance of the imaging lens. For example, there has been a demand for performance corresponding to high resolution of 5 megapixels or higher, and preferably performance corresponding to high resolution of 8 megapixels or higher.

To satisfy such demands, it can be considered that the imaging lens is composed of five or six lenses, which are a relatively large number of lenses. For example, Chinese Utility Model Nos. 201903684 (Patent Document 1) and 202141850 (Patent Document 2) propose an imaging lens composed of five lenses. The imaging lens disclosed in Patent Documents 1 and 2 substantially consists of, in order from an object side, five lenses of a first lens that has a positive refractive power, a second lens that has a negative refractive power, a third lens that has a negative refractive power, a fourth lens that has a positive refractive power, and a fifth lens that has a negative refractive power.

SUMMARY OF THE INVENTION

In particular, for the imaging lenses used in apparatuses, of which the thickness has been decreased, such as a cellular phone, a smartphone or a tablet terminal, a demand to decrease the total length of the lens has been increased more and more. Hence, it is necessary to further decrease the total lengths of the imaging lenses disclosed in Patent Documents 1 and 2.

The present invention has been made in view of the above-mentioned circumstances and an object thereof is to provide an imaging lens capable of achieving high imaging performance in the range from the central angle of view to the peripheral angle of view while achieving a decrease in the total length thereof. Another object of the present invention is to provide an imaging apparatus capable of obtaining a photographed image with high resolution through the imaging lens which is mounted thereon.

The imaging lens of the present invention is an imaging lens substantially consisting of, in order from an object side, five lenses of:

a first lens that has a positive refractive power and has a meniscus shape which is concave toward an image side;

a second lens that has a negative refractive power and has a meniscus shape which is concave toward the image side;

a third lens that has a biconcave shape;

a fourth lens that has a positive refractive power and has a meniscus shape which is convex toward the image side; and a fifth lens that has a biconcave shape and has an aspheric shape which has at least one extreme point on an image side surface, wherein the following conditional expression (1) is satisfied:

$$-2.127 < f/f5 < 0 \qquad (1),\text{ where}$$

f is a focal length of a whole system, and
f5 is a focal length of the fifth lens.

According to the imaging lens of the present invention, in the imaging lens which is composed of five lenses as a whole, a configuration of each lens element of the first to fifth lenses is optimized. Therefore, it is possible to achieve a lens system that has high resolution performance while decreasing the total length thereof.

In the imaging lens of the present invention, the expression "substantially consisting of five lenses" means that the imaging lens of the present invention may include not only the five lenses but also a lens which has substantially no refractive power, optical elements, such as a stop and a cover glass, which are not a lens, mechanism parts, such as a lens flange, a lens barrel, an imaging device and a hand shake blur correction mechanism, and the like. When the lens includes an aspheric surface, the reference sign of the surface shape and refractive power of the lens is considered in a paraxial region.

In the imaging lens of the present invention, by employing and satisfying the following desirable configuration, it is possible to make the optical performance thereof better.

In the imaging lens of the present invention, it is desirable that an image side surface of the third lens have an aspheric shape which has at least one extreme point, an intersection point between the image side surface of the third lens and a principal ray with a maximum angle of view be positioned on the object side of an intersection point between the image side surface of the third lens and an optical axis, and an intersection point between an object side surface of the third lens and the principal ray with the maximum angle of view be positioned on the object side of an intersection point between the object side surface of the third lens and the optical axis.

It is desirable that the imaging lens of the present invention further include an aperture stop that is disposed on the object side of an object side surface of the second lens.

It is desirable that the imaging lens of the present invention satisfy any of the following conditional expressions (1-1) to (3). It should be noted that, as a desirable mode, any one of the conditional expressions (1-1) to (3) may be satisfied, or an arbitrary combination thereof may be satisfied.

$$-2.06 < f/f5 < -0.56 \qquad (1\text{-}1)$$

$$-2.01 < f/f5 < -1.12 \qquad (1\text{-}2)$$

$$0 < f/f4 < 3 \qquad (2)$$

$$0.7 < f/f4 < 2.5 \qquad (2\text{-}1)$$

$$1.4 < f/f4 < 2.1 \qquad (2\text{-}2)$$

$$|f2|<|f3| \quad (3)$$

Here, f is a focal length of the whole system, f2 is a focal length of the second lens, f3 is a focal length of the third lens, f4 is a focal length of the fourth lens, and f5 is a focal length of the fifth lens.

The imaging apparatus of the present invention includes the imaging lens of the present invention.

According to the imaging lens of the present invention, in the imaging lens which is composed of five lenses as a whole, a configuration of each lens element is optimized, and particularly the shape of the fifth lens is appropriately formed. Therefore, it is possible to achieve a lens system that has high resolution performance in the range from the central angle of view to the peripheral angle of view while decreasing the total length thereof.

Further, according to the imaging apparatus of the present invention, imaging signals based on an optical image formed by the imaging lens of the present invention, which has high imaging performance, are output. Therefore, it is possible to obtain a photographed image with high resolution.

DESCRIPTION OF THE PREFERRED EMBODIMENTS

Hereinafter, embodiments of the present invention will be described in detail with reference to the accompanying drawings.

Figure 1:
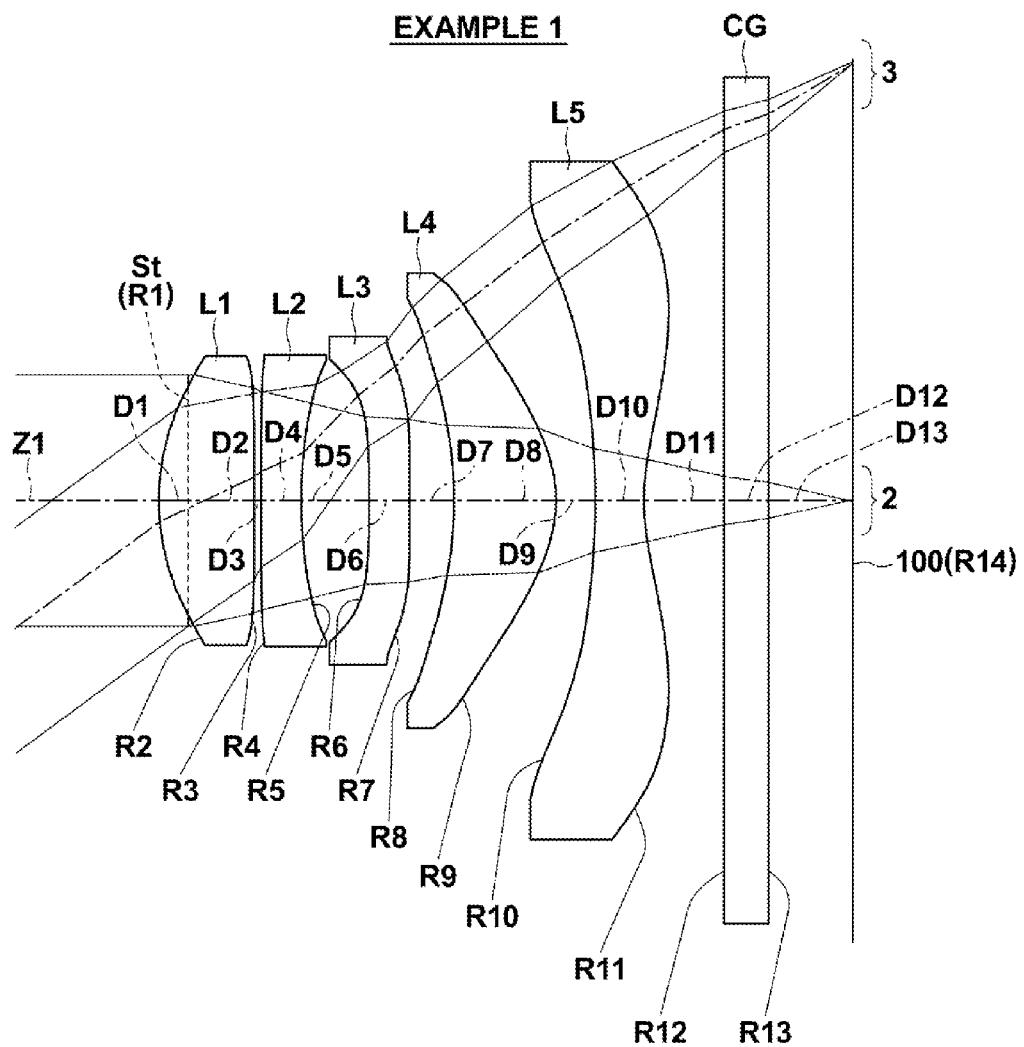
FIG. 1 is a lens cross-sectional view illustrating a first configuration example of an imaging lens according to an embodiment of the present invention and corresponding to Example 1.
Figure 2:
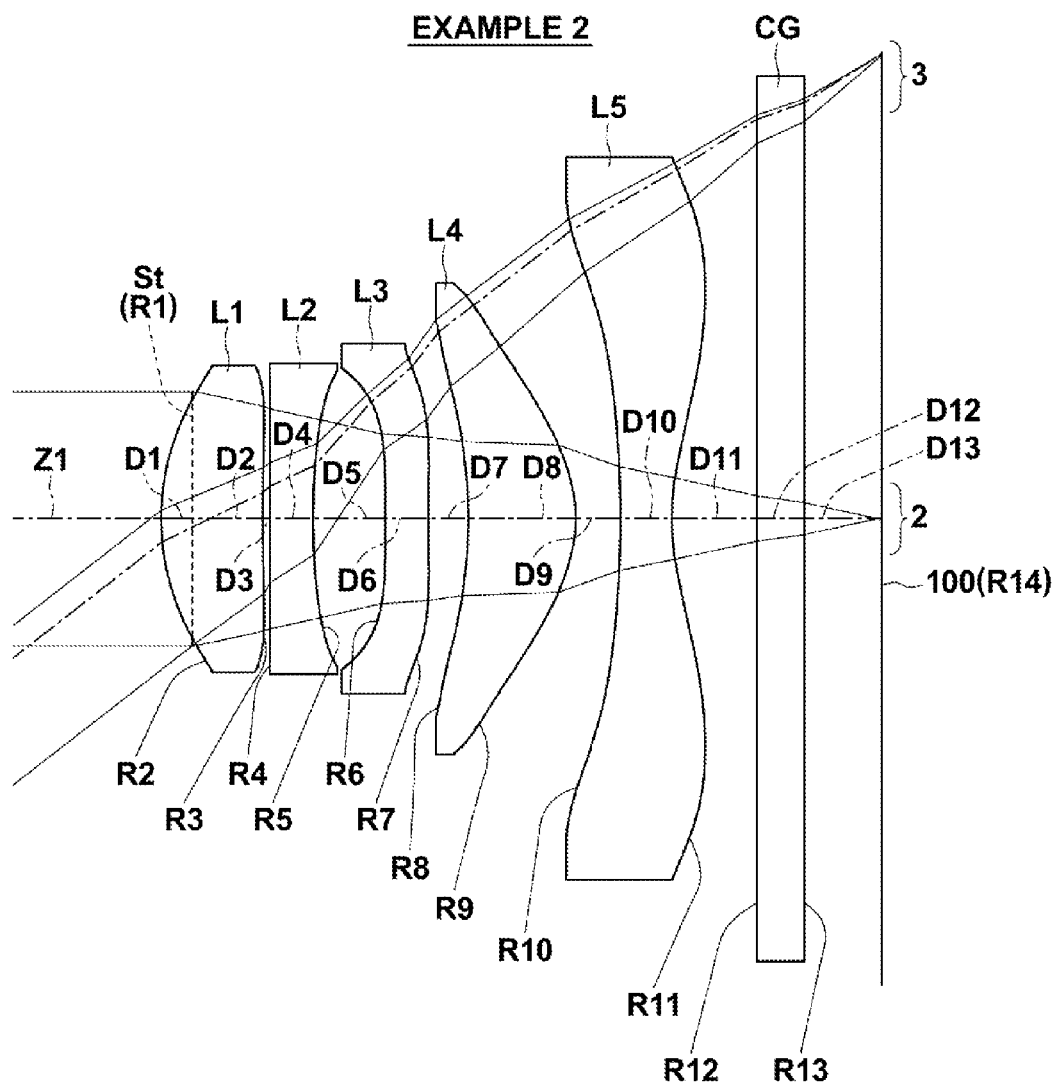
FIG. 2 is a lens cross-sectional view illustrating a second configuration example of an imaging lens according to an embodiment of the present invention and corresponding to Example 2.
Figure 3:
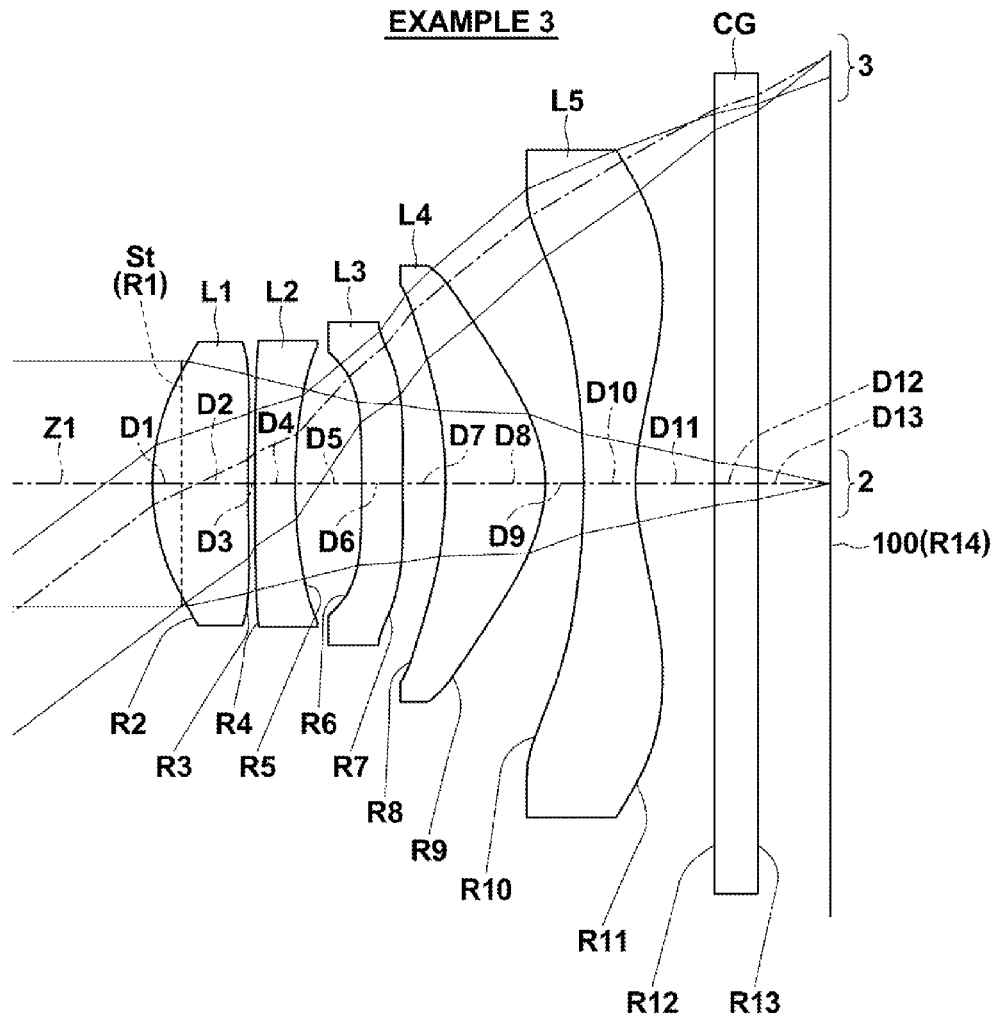
FIG. 3 is a lens cross-sectional view illustrating a third configuration example of an imaging lens according to an embodiment of the present invention and corresponding to Example 3.
Figure 4:
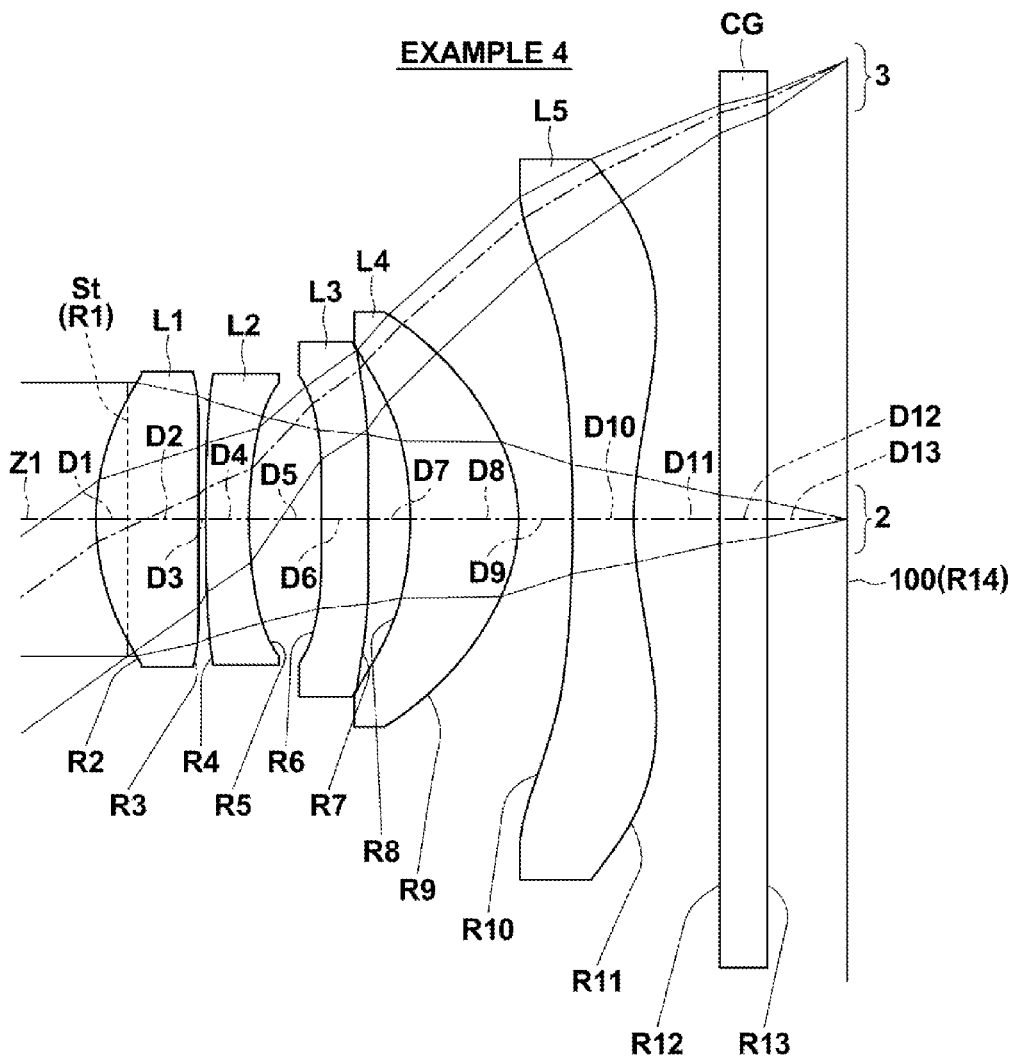
FIG. 4 is a lens cross-sectional view illustrating a fourth configuration example of an imaging lens according to an embodiment of the present invention and corresponding to Example 4.

FIG. 1 shows a first configuration example of an imaging lens according to a first embodiment of the present invention. The configuration example corresponds to a lens configuration of a first numerical value example (Table 1 and Table 2) to be described later. Likewise, FIGS. 2 to 4 show cross sections of second to fourth configuration examples corresponding to the imaging lenses according to second to fourth embodiments to be described later. The second to fourth configuration examples correspond to lens configurations of the second to fourth numerical value examples (Tables 3 to 8) to be described later. In FIGS. 1 to 4, the reference sign Ri represents a radius of curvature of i-th surface, where the number is the sequential number that sequentially increases as it gets closer to an image side (an imaging side) when a surface of a lens element closest to an object side is regarded as a first surface. The reference sign Di represents an on-axis surface spacing between i-th surface and (i+1)th surface on an optical axis Z1. Since the respective configuration examples are basically similar in configuration, the following description will be given on the basis of the first configuration example of the imaging lens shown in FIG. 1, and the configuration examples shown in FIGS. 2 to 4 will be also described as necessary. Further, FIGS. 1 to 4 also show the optical paths of on-axis rays 2 from the object point at an infinite distance, and rays 3 at the maximum angle of view.

An imaging lens L according to an embodiment of the present invention is appropriate to be used in various kinds of imaging apparatuses using imaging devices such as a CCD and a CMOS. Especially, the imaging lens L is appropriate to be used in relatively small-sized mobile terminal apparatus, for example, such as a digital still camera, a cellular phone with a camera, a smartphone, a tablet terminal, and a PDA. This imaging lens L includes, along the optical axis Z1, a first lens L1, a second lens L2, a third lens L3, a fourth lens L4, and a fifth lens L5 in this order from the object side.

Figure 9:
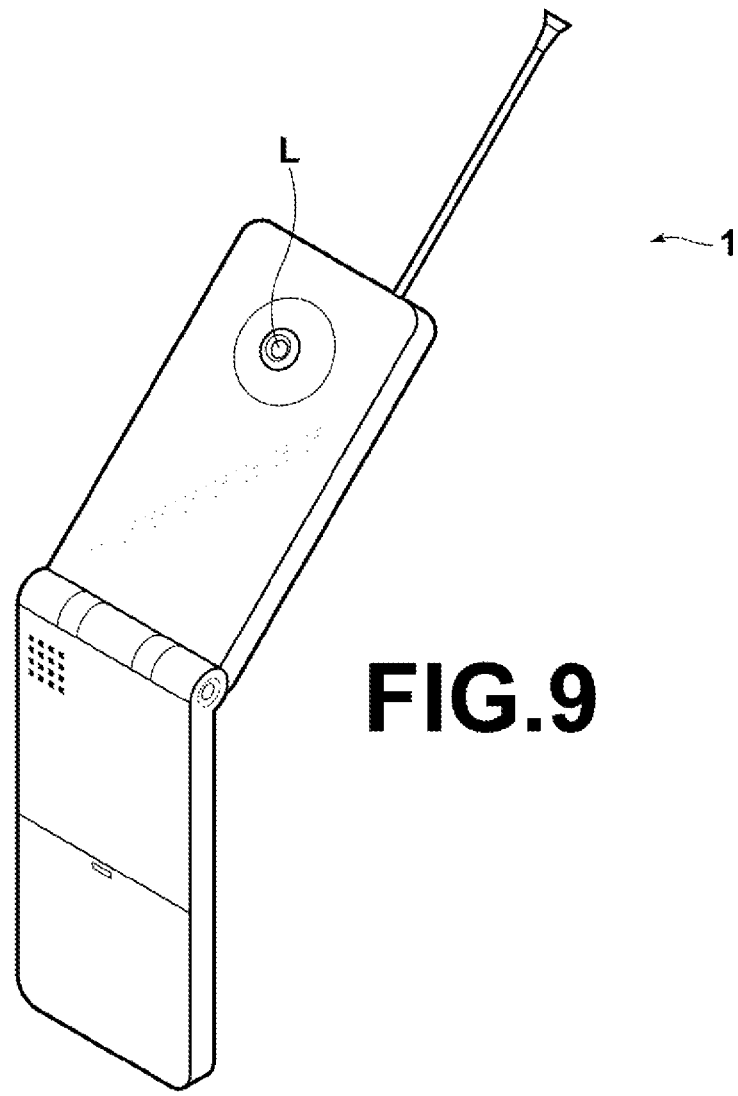
FIG. 9 is a diagram illustrating an imaging apparatus which is a cellular phone terminal including the imaging lens according to the present invention.

FIG. 9 is a schematic diagram illustrating a cellular phone terminal, which is an imaging apparatus 1 according to an embodiment of the present invention. The imaging apparatus 1 according to the embodiment of the present invention includes imaging lens L according to the present embodiment and an imaging device 100 (refer to FIG. 1), such as a CCD, which outputs imaging signals based on an optical image formed by the imaging lens L. The imaging device 100 is disposed at an image formation surface (image plane R14) of the imaging lens L.

Figure 10:
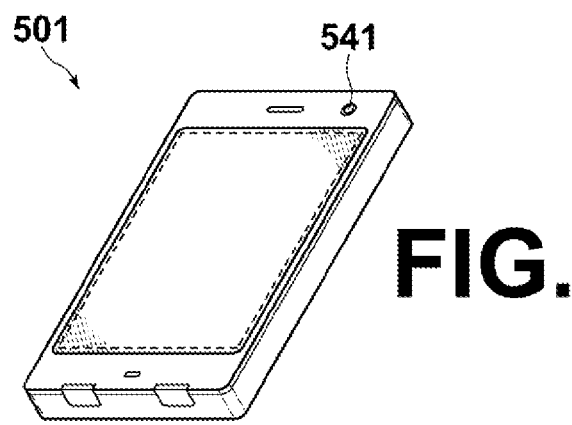
FIG. 10 is a diagram illustrating an imaging apparatus which is a smartphone including the imaging lens according to the present invention.

FIG. 10 is a schematic diagram illustrating a smartphone which is an imaging apparatus 501 according to an embodiment of the present invention. The imaging apparatus 501 according to the embodiment of the present invention includes a camera unit 541 including the imaging lens L according to the present embodiment and the imaging device 100 (refer to FIG. 1), such as a CCD, which outputs imaging signals based on an optical image formed by the imaging lens L. The imaging device 100 is disposed at the image formation surface (image plane R14) of the imaging lens L.

Various optical members CG may be disposed between the fifth lens L5 and the imaging device 100 based on the configuration of a camera on which the imaging lens is mounted. For example, a flat-plate-shaped optical member, such as a cover glass for protecting an imaging surface and an infrared-ray cut filter, may be disposed. In this case, for example, a flat-plate-shaped cover glass to which a coating having an effect of a filter, such as an infrared-ray cut filter and an ND filter, has been applied, or a material having the same effect may be used as the optical member CG.

Alternatively, an effect similar to the optical member CG may be given to the fifth lens L5 or the like by applying a coating to the fifth lens L5 or the like without using the optical member CG. Thereby, it is possible to reduce the number of components, and to reduce the total length.

Further, it is desirable that the imaging lens L includes an aperture stop St disposed on the object side of an object side surface of the second lens L2. Since the aperture stop St is disposed on the object side of the object side surface of the second lens L2 in such a manner, especially in a peripheral portion of an imaging area, it is possible to prevent an angle of incidence of rays, which pass through the optical system and are incident onto an imaging surface (imaging device), from becoming large. In order to further enhance this effect, it is more desirable that the aperture stop St be disposed on the object side of an object side surface of the first lens L1. Here, the expression "disposed on the object side of the object side surface of the second lens L2" means that the position of the aperture stop in the optical axis direction is the same as an intersection point between an on-axis marginal ray and the object side surface of the second lens L2 or located on the object side of the intersection point. Likewise, the expression "disposed on the object side of an object side surface of the first lens L1" means that the position of the aperture stop in the optical axis direction is the same as an intersection point between an on-axis marginal ray and the object side surface of the first lens L1 or located on the object side of the intersection point.

Furthermore, when the aperture stop St is disposed on the object side of the object side surface of the first lens L1 in the optical axis, it is desirable that the aperture stop St be disposed on the image side of a vertex of the surface of the first lens L1. When the aperture stop St is disposed on the image side of the vertex of the surface of the first lens L1 in such a manner, it is possible to reduce the total length of the imaging lens including the aperture stop St. The imaging lenses according to the first to fourth embodiments (refer to FIGS. 1 to 4) are configuration examples in which the aperture stop St is disposed on the object side of the object side surface of the first lens L1, and the aperture stop St is disposed on the image side of the vertex of the surface of the first lens L1. However, the invention is not limited to the embodiments, and the aperture stop St may be disposed on the object side of the vertex of the surface of the first lens L1. The arrangement, in which the aperture stop St is disposed on the object side of the vertex of the surface of the first lens L1, is slightly disadvantageous in terms of securing a peripheral light amount, compared with a case where the aperture stop St is disposed on the image side of the vertex of the surface of the first lens L1. However, the arrangement can prevent an angle of incidence of rays, which pass through the optical system and are incident onto the imaging surface (imaging device), from becoming large in the peripheral portion of the imaging area in a more desirable manner. It should be noted that the aperture stop St shown herein does not necessarily represent the size or shape thereof but shows the position thereof on the optical axis Z1.

In the imaging lens L, the first lens L1 has a positive refractive power, and has a meniscus shape which is concave toward the image side in the vicinity of the optical axis. By forming the first lens L1 in a meniscus shape which is concave toward the image side in the vicinity of the optical axis, the position of the rear side principal point of the first lens L1 can be set to be close to the object side, and thus it is possible to appropriately reduce the total length. Further, as shown in the first to fourth embodiments, by forming the first lens L1 in an aspheric shape, it is possible to appropriately correct a spherical aberration.

The second lens L2 has a negative refractive power in the vicinity of the optical axis. The second lens L2 has a meniscus shape which is concave toward the image side in the vicinity of the optical axis. Hence, it is possible to satisfactorily correct a spherical aberration and a longitudinal chromatic aberration which are caused when the rays pass through the first lens L1. Further, by forming the second lens L2 in a meniscus shape which is concave toward the image side in the vicinity of the optical axis, the position of the rear side principal point of the second lens L2 can be set to be close to the object side, and thus it is possible to appropriately reduce the total length.

The third lens L3 has a negative refractive power in the vicinity of the optical axis. In addition, the third lens L3 has a biconcave shape in the vicinity of the optical axis. Further, it is desirable that, as shown in the first to fourth embodiments, an absolute value |f3| of the focal length of the third lens L3 be set to the maximum among absolute values |f1| to |f5| of the focal lengths of the first to fifth lenses L1 to L5. In this case, it is possible to appropriately reduce an effect of change in a shape of the surface of the third lens L3 on the focal length of the whole system, and thus the third lens L3 can be flexibly designed to have a shape of the surface appropriate for correcting various aberrations.

Further, as shown in FIGS. 1 to 4, it is desirable that the image side surface of the third lens L3 have an aspheric shape which has at least one extreme point, an intersection point between the image side surface of the third lens L3 and a principal ray with a maximum angle of view be positioned on the object side of an intersection point between the image side surface of the third lens L3 and an optical axis, and an intersection point between an object side surface of the third lens L3 and the principal ray with the maximum angle of view be positioned on the object side of an intersection point between the object side surface of the third lens L3 and the optical axis. In this case, it is possible to appropriately correct a spherical aberration and astigmatism, and it is possible to achieve high resolution performance in the range from the central angle of view to the peripheral angle of view. Furthermore, the extreme point of the image side surface of the third lens L3 can be disposed at an arbitrary position on the inside of the intersection point between the image side surface of the third lens L3 and the principal ray with the maximum angle of view in a radial direction of the third lens L3.

It should be noted that, in the present description, the "extreme point" means a point at which a function $fx(r)$ is at a maximum value or a minimum value when a point on the lens surface is represented by $(r, fx(r))$. Here, the distance from the optical axis in a direction perpendicular to the optical axis is $r$ ($r>0$), and a function representing the position at the distance $r$ in the optical axis direction is $fx(r)$. All the extreme points of the respective embodiments of the present description are extreme points at which the tangent plane is perpendicular to the optical axis.

Further, in the imaging lens, the first lens L1 has a positive refractive power in the vicinity of the optical axis, and the second lens L2 and the third lens L3 have negative refractive powers in the vicinity of the optical axis. Hence, the lens group formed of the first to third lenses L1 to L3 (hereinafter referred to as a first lens group) can be made to have a telephoto type configuration. In the configuration, the first lens L1 having the positive refractive power is disposed on the object side, and the second lens L2 and the third lens L3 having the negative refractive powers are disposed on the image side. Hence, the position of the rear side principal point of the first lens group, which is formed of the first to third lenses L1 to L3, can be set to be close to the object side, and thus it is possible to appropriately reduce the total length.

The fourth lens L4 has a positive refractive power in the vicinity of the optical axis. Further, as shown in the first to fourth embodiments, the fourth lens L4 has a meniscus shape which is convex toward the image side in the vicinity of the optical axis. Thereby, it is possible to decrease an angle of incidence at which light is incident onto the object side surface of the fourth lens L4, compared with a case where the fourth lens L4 is concave toward the image side in the vicinity of the optical axis, and it is possible to suppress occurrence of various aberrations. Hence, it is possible to appropriately correct distortion (a distortion aberration), a lateral chromatic aberration, and astigmatism which tend to be caused by reduction in the total length.

The fifth lens L5 has a negative refractive power in the vicinity of the optical axis. As described above, by making the fourth lens L4 have a positive refractive power and making the fifth lens L5 have a negative refractive power in the vicinity of the optical axis, the lens group formed of the fourth lens L4 and the fifth lens L5 (hereinafter referred to as a second lens group) can be made to have a telephoto type configuration. Hence, the position of the rear side principal point of the second lens group can be set to be close to the object side, and thus it is possible to appropriately reduce the total length.

The fifth lens L5 has a biconcave shape in the vicinity of the optical axis. Further, as shown in first to fourth embodiments, the fifth lens L5 has an aspheric shape which is concave toward the image side in the vicinity of the optical axis and has at least one extreme point on the image side surface. By making the fifth lens L5 have the aspheric shape which is concave toward the image side in the vicinity of the optical axis and has at least one extreme point on the image side surface, it is possible to satisfactorily correct curvature of field and achieve high resolution performance in the range from the central angle of view to the peripheral angle of view while suppressing occurrence of distortion in the positive direction. The extreme point of the image side surface of the fifth lens L5 can be disposed at an arbitrary position on the inside of the intersection point between the image side surface of the fifth lens L5 and the principal ray with the maximum angle of view in the radial direction of the fifth lens L5.

Further, by making the fifth lens L5 concave toward the image side and making the image side surface of the fifth lens L5 have an aspheric shape which has an extreme point, especially in the peripheral portion of the imaging area, it is possible to prevent the angle of incidence of rays, which pass through the optical system and are incident onto the imaging surface (imaging device), from becoming large. It should be noted that the peripheral portion described herein means outside of about 60% of the height in the radial direction. Here, the height is a height of the intersection point between the principal ray with the maximum angle of view and the surface from the optical axis.

According to the imaging lens L, in the imaging lens which is composed of five lenses as a whole, a configuration of each lens element of the first to fifth lenses L1 to L5 is optimized. Therefore, it is possible to achieve a lens system that has high resolution performance while decreasing the total length thereof.

According to the imaging lens L, all the five lenses are configured to be divided into the first lens group including the first to third lenses L1 to L3 and the second lens group including the fourth lens L4 and the fifth lens L5, and as described above, the first lens group and the second lens group are respectively configured as telephoto types. Hence, it is possible to appropriately achieve reduction in the total length.

The lens system disclosed in Patent Document 1 or Patent Document 2 also substantially consisting of, in order from the object side: a first lens having a positive refractive power; a second lens having a negative refractive power; a third lens having a negative refractive power; a fourth lens having a positive refractive power; and a fifth lens having a negative refractive power, and the lens system is composed of a first lens group including the first to third lenses and a second lens group including the fourth lens and the fifth lens. However, in the lens system disclosed in Patent Document 1 or Patent Document 2, the negative refractive power of the fifth lens is excessively strong, and thus in order to achieve balance in the refractive power, the refractive power of the fourth lens is made to be strong by securing the center thickness of the fourth lens. For this reason, the on-axis length of the second lens group formed of the fourth lens and the fifth lens is not sufficiently reduced. As a result, there is a new demand to decrease the total length thereof.

In contrast, according to the imaging lens L, as shown in the conditional expression (1), the refractive power of the fifth lens L5 is appropriately set not to become excessively strong relative to the refractive power of the whole lens. Hence, in order to secure the refractive power of the fourth lens L4, it is not necessary to increase the center thickness of the fourth lens L4, and it is possible to reduce the length of the second lens group in the optical axis direction. As a result, it is possible to further appropriately achieve reduction in the total length. Furthermore, the negative refractive power of the second lens group including the fourth lens L4 and the fifth lens L5 is appropriately set not to become excessively strong relative to the refractive power of the whole lens. Hence, it is not necessary to make a stronger positive refractive power of the first lens group than is necessary, and thus it is possible to appropriately reduce the total length while satisfactorily correcting various aberrations.

In the imaging lens L, in order to enhance the performance thereof, it is desirable that at least one surface of each lens of the first to fifth lenses L1 to L5 be formed as an aspheric surface.

Further, it is desirable that each of the lenses L1 to L5 constituting the imaging lens L be not formed as a cemented lens but a single lens. The reason is that, compared with a case where any of the lenses L1 to L5 is formed as a cemented lens, since the number of aspheric surfaces increases, a degree of freedom in design of each lens is enhanced, and it is possible to appropriately achieve reduction in the total length thereof.

Further, for example, as in the imaging lenses according to the first to fourth embodiments, when each lens configuration of the first to fifth lenses L1 to L5 of the imaging lens L is set such that the total angle of view is equal to or greater than 60 degrees, the imaging lens L can be appropriately applied to a cellular phone terminal and the like which are often used in a close-up shot.

Next, effects and advantages of the conditional expressions of the imaging lens L configured as described above will be described in detail. Regarding conditional expressions (conditional expressions (1-1) to (3)) excluding the conditional expression (1) to be described later, it is desirable that the imaging lens L satisfies any one or an arbitrary combination of the conditional expressions. It is desirable that the conditional expressions to be satisfied be appropriately selected in accordance with factors necessary for the imaging lens L.

First, the focal length f of the whole system and the focal length f5 of the fifth lens L5 satisfy the following conditional expression (1).

$$-2.127 < f/f5 < 0 \tag{1}$$

The conditional expression (1) defines a desirable numerical range of a ratio of the focal length f of the whole system to the focal length f5 of the fifth lens L5. By maintaining the negative refractive power of the fifth lens L5 such that the f/f5 is greater than the lower limit of the conditional expression (1), the negative refractive power of the fifth lens L5 becomes not excessively strong relative to the refractive power of the whole system, and thus, especially at the medium angle of view, it is possible to prevent the angle of incidence of rays, which pass through the optical system and are incident onto the imaging surface (imaging device), from becoming large. Further, by securing the negative refractive power of the fifth lens L5 such that the f/f5 is less than the upper limit of the conditional expression (1), the negative refractive power of the fifth lens L5 becomes not excessively weak relative to the refractive power of the whole system, and thus it is possible to satisfactorily correct curvature of field while reducing the total length. In order to further enhance the effect, it is desirable to satisfy the conditional expression (1-1), and it is more desirable to satisfy the conditional expression (1-2).

$$-2.06 < f/f5 < -0.56 \tag{1-1}$$

$$-2.01 < f/f5 < -1.12 \tag{1-2}$$

It is desirable that a focal length f4 of the fourth lens L4 and the focal length f of the whole system satisfy the following conditional expression (2).

$$0 < f/f4 < 3 \tag{2}$$

The conditional expression (2) defines a desirable numerical range of a ratio of the focal length f of the whole system to the focal length f4 of the fourth lens L4. By securing the positive refractive power of the fourth lens L4 such that the f/f4 is greater than the lower limit of the conditional expression (2), the positive refractive power of the fourth lens L4 becomes not excessively weak relative to the refractive power of the whole system, and thus, especially at the medium angle of view, it is possible to more appropriately prevent the angle of incidence of rays, which pass through the optical system and are incident onto the imaging surface (imaging device), from becoming large. In addition, it is possible to appropriately correct distortion (a distortion aberration) and a lateral chromatic aberration. By maintaining the positive refractive power of the fourth lens L4 such that the f/f4 is less than the upper limit of the conditional expression (2), the positive refractive power of the fourth lens L4 becomes not excessively strong relative to the refractive power of the whole system, and thus it is possible to appropriately correct a spherical aberration and astigmatism. In order to further enhance the effect, it is desirable to satisfy the conditional expression (2-1), and it is more desirable to satisfy the conditional expression (2-2).

$$0.7 < f/f4 < 2.5 \tag{2-1}$$

$$1.4 < f/f4 < 2.1 \tag{2-2}$$

Further, it is desirable that the focal length f3 of the third lens L3 and the focal length f2 of the second lens L2 satisfy the following conditional expression (3).

$$|f2| < |f3| \tag{3}$$

The conditional expression (3) defines a desirable numerical range of a ratio of the focal length f2 of the second lens L2 to the focal length f3 of the third lens L3. By making the negative refractive power of the third lens L3 weaker than the negative refractive power of the second lens L2 such that the conditional expression (3) is satisfied, it is possible to appropriately reduce the effect of the change in the shape of the surface of the third lens L3 on the focal length of the whole system. In addition, the third lens L3 can be flexibly designed to have a shape of the surface appropriate for correcting various aberrations. Therefore, by satisfying the conditional expression (3), it is possible to easily achieve reduction in the total length while satisfactorily correcting various aberrations.

As described above, according to the imaging lens of the embodiment of the present invention, in the imaging lens which is composed of five lenses as a whole, the configuration of each lens element is optimized. Therefore, it is possible to achieve a lens system that has high resolution performance while decreasing the total length thereof.

By satisfying appropriately desirable conditions, it is possible to achieve higher imaging performance. Furthermore, according to the imaging apparatus of the embodiment, imaging signals based on an optical image, which is formed by the high-performance imaging lens according to the embodiment, are output. Therefore, it is possible to obtain a photographed image with high resolution in the range from the central angle of view to the peripheral angle of view.

Next, specific numerical examples of the imaging lens according to the embodiment of the present invention will be described. Hereinafter, a plurality of numerical examples will be described collectively.

Table 1 and Table 2, which will be given later, show specific lens data corresponding to the configuration of the imaging lens shown in FIG. 1. Specifically, Table 1 shows basic lens data, and Table 2 shows data on aspheric surfaces. In the lens data shown in Table 1, the column of surface number Si shows the surface number of the i-th surface in the imaging lens of Example 1. The surface of the lens element closest to the object side is the first surface (the aperture stop St is the first), and surface numbers sequentially increase toward the image side. The column of the radius of curvature Ri shows values (mm) of the radius of curvature of i-th surface from the object side to correspond to the reference sign Ri in FIG. 1. Likewise, the column of the on-axis surface spacing Di shows spaces (mm) on the optical axis between the i-th surface Si and the (i+1)th surface Si+1 on the optical axis from the object side. The column of Ndj shows values of the refractive index of the j-th optical element from the object side for the d-line (587.56 nm). The column of νdj shows values of the Abbe number of the j-th optical element from the object side for the d-line.

In the imaging lens according to Example 1, both surfaces of each of the first to fifth lenses L1 to L5 are aspheric. In the basic lens data shown in Table 1, the radii of curvature of these aspheric surfaces are represented as numerical values of the radius of curvature near the optical axis (paraxial radius of curvature).

Table 2 shows aspheric surface data in the imaging lens system according to Example 1. In the numerical values represented as the aspheric surface data, the reference sign "E"

means that a numerical value following this is a "exponent" having a base of 10 and that this numerical value having a base of 10 and expressed by an exponential function is multiplied by a numerical value before the "E". For example, this means that "1.0E-02" is "1.0×10⁻²".

As aspheric surface data, values of coefficients Ai and KA in the aspheric surface expression represented by the following expression (A) are shown. Specifically, Z represents the length (mm) of a perpendicular from a point on an aspheric surface at height h from an optical axis to a plane that contacts with the vertex of the aspheric surface (the plane perpendicular to the optical axis).

$$Z = C \cdot h^2 / \{1 + (1 - KA \cdot C^2 \cdot h^2)^{1/2}\} + \Sigma Ai \cdot h^i \quad (A)$$

Here,

Z is a depth of the aspheric surface (mm), h is a distance (height) from the optical axis to the lens surface (mm), C is a paraxial curvature=1/R (R: a paraxial radius of curvature), Ai is an i-th order aspheric surface coefficient (i is an integer equal to or greater than 3), and KA is an aspheric surface coefficient.

In a similar manner to the imaging lens according to the above-mentioned Example 1, Tables 3 to 8 show specific lens data as Examples 2 to 4, corresponding to the configuration of the imaging lenses shown in FIGS. 2 to 4. In the imaging lenses according to Examples 1 to 4, both surfaces of each of the first to fifth lenses L1 to L5 are aspheric.

Figure 5:
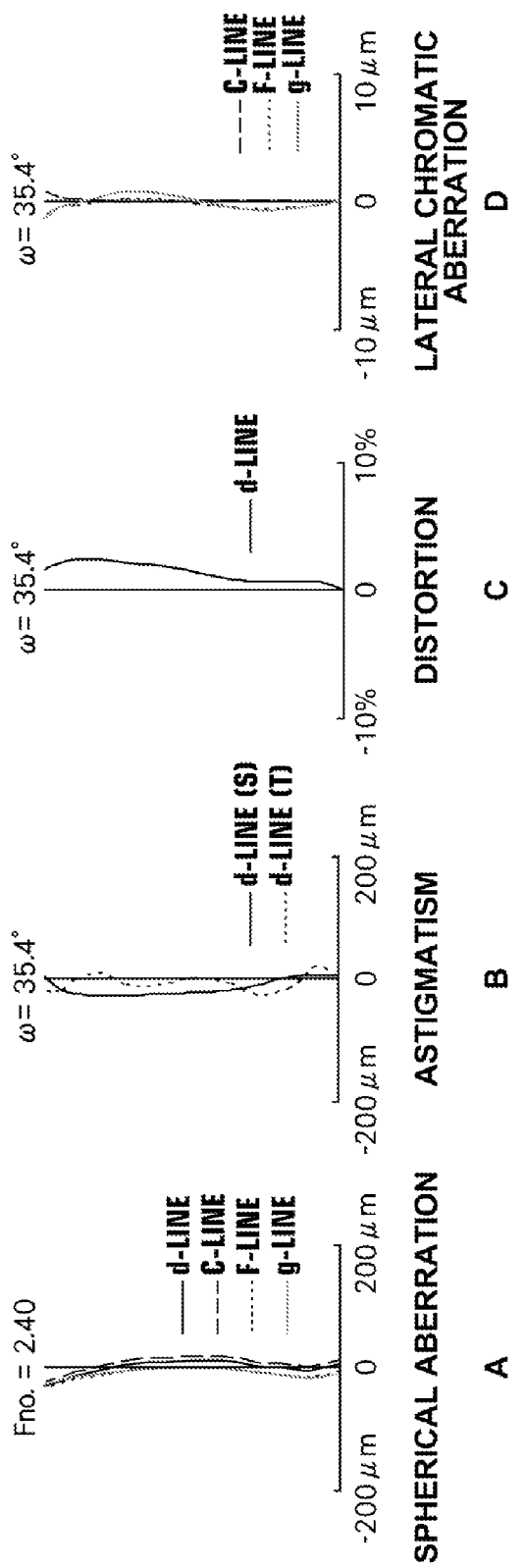
FIG. 5 is an aberration diagram illustrating various aberrations of an imaging lens according to Example 1 of the present invention, where Section A shows a spherical aberration, Section B shows astigmatism (curvature of field), Section C shows distortion, and Section D shows a lateral chromatic aberration.

FIG. 5, Section A to Section D show a spherical aberration, astigmatism (curvature of field), distortion (a distortion aberration), and a lateral chromatic aberration (a chromatic aberration of magnification) in the imaging lens of Example 1, respectively. Each aberration diagram illustrating a spherical aberration, astigmatism (curvature of field), and distortion (a distortion aberration) shows an aberration for the d-line (a wavelength of 587.56 nm) as a reference wavelength. The diagram of a spherical aberration diagram and the diagram of a lateral chromatic aberration diagram show also aberrations for the F-line (a wavelength of 486.1 nm) and the C-line (a wavelength of 656.27 nm). The diagram of a spherical aberration also shows an aberration for the g-line (a wavelength of 435.83 nm). In the diagram of astigmatism, the solid line indicates an aberration in the sagittal direction (S), and the broken line indicates an aberration in the tangential direction (T).

Figure 6:
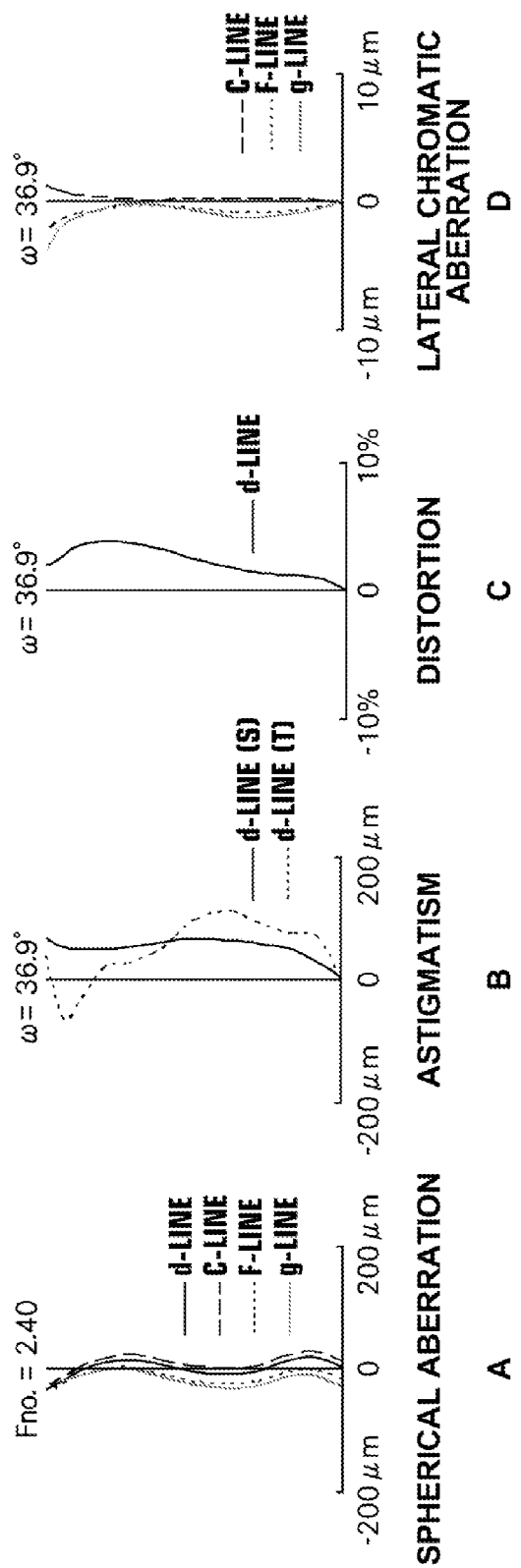
FIG. 6 is an aberration diagram illustrating various aberrations of an imaging lens according to Example 2 of the present invention, where Section A shows a spherical aberration, Section B shows astigmatism (curvature of field), Section C shows distortion, and Section D shows a lateral chromatic aberration.
Figure 7:
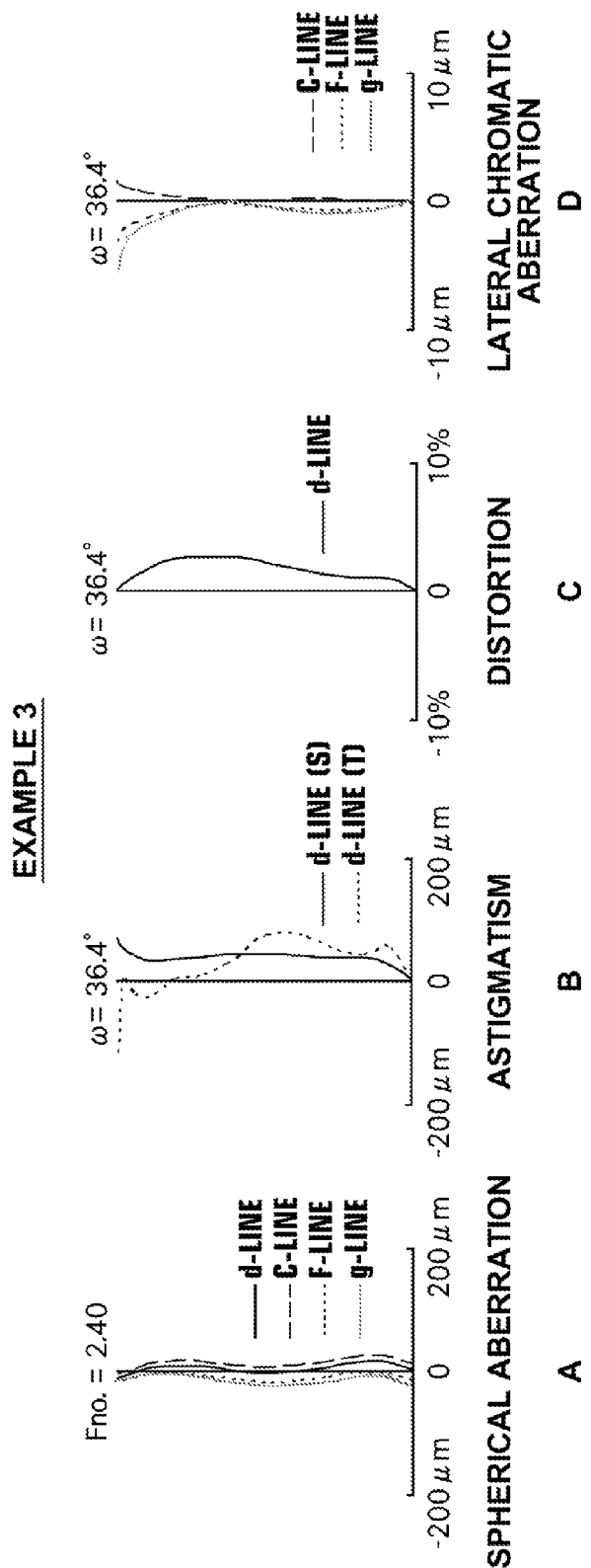
FIG. 7 is an aberration diagram illustrating various aberrations of an imaging lens according to Example 3 of the present invention, where Section A shows a spherical aberration, Section B shows astigmatism (curvature of field), Section C shows distortion, and Section D shows a lateral chromatic aberration.
Figure 8:
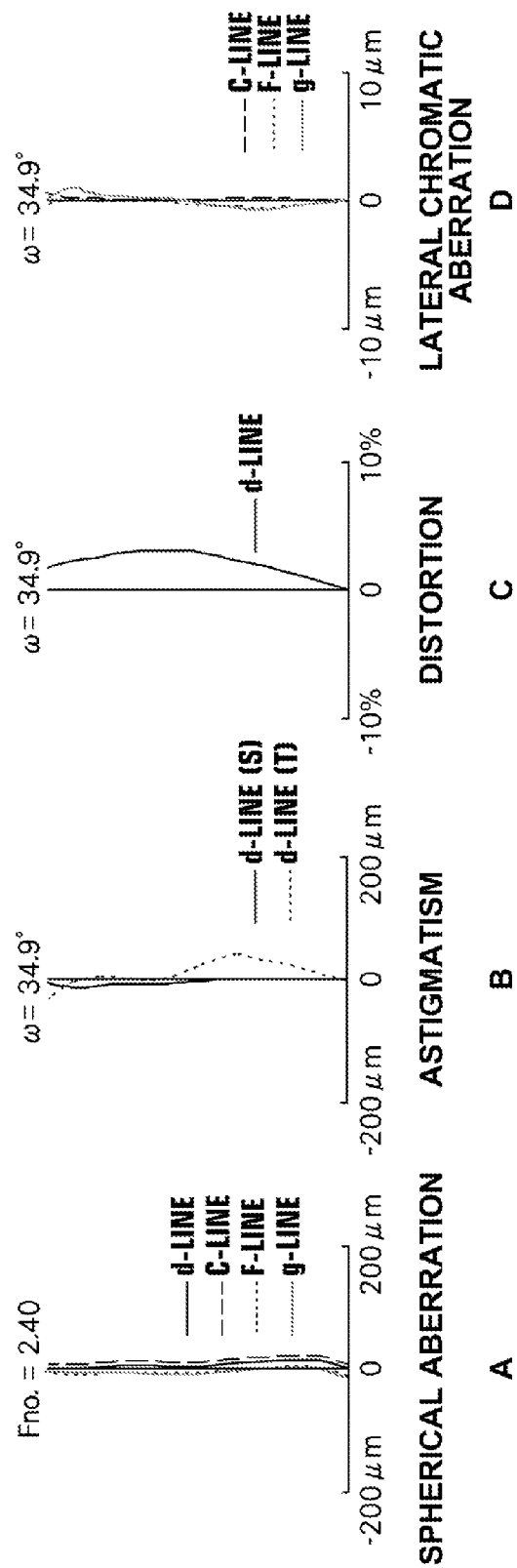
FIG. 8 is an aberration diagram illustrating various aberrations of an imaging lens according to Example 4 of the present invention, where Section A shows a spherical aberration, Section B shows astigmatism (curvature of field), Section C shows distortion, and Section D shows a lateral chromatic aberration.

Likewise, FIG. 6, Section A to D to FIG. 8, Section A to D show various aberrations of the imaging lenses of Examples 2 to 4.

Table 9 shows various data and values corresponding to conditional expressions (1) to (3) in the imaging lenses according to Examples 1 to 4. In Examples 1 to 4, the d-line is set as a reference wavelength, and the values for the reference wavelength are shown in Table 9.

In Table 9, f is the focal length of the whole system, Bf is a distance on the optical axis from the image side surface of the lens closest to the image side to the image plane (Bf corresponds to a back focal length), L is a distance on the optical axis from the object side surface of the first lens L1 to the image plane 100, 2ω is a total angle of view, and Fno. is an F-number. Bf is an air conversion length, that is, indicates a value which is calculated by air-converting the thickness of the optical member CG. Likewise, the back focal length portion of L uses an air conversion length. As can be seen from Table 9, all Examples 1 to 4 satisfy the conditional expressions (1) to (3). In Table 9, the units of the focal length f of the whole system, the focal lengths f1 to f5 of the first to fifth lenses L1 to L5, the back focal length Bf, and the distance L on the optical axis from the object side surface of the first lens L1 to the image plane 100 are millimeters (mm).

As can be seen from the above-mentioned numerical value data and aberration diagrams, in each example, high imaging performance is achieved while the total length is reduced.

The imaging lens of the present invention is not limited to the above-mentioned embodiments and examples, and may be modified to various forms. For example, the values of the radius of curvature, the on-axis surface spacing, the refractive index, the Abbe number, the aspheric surface coefficient, and the like of the lens elements are not limited to the values shown in the numerical examples, and may have different values.

Further, in the description of each of all the examples, it is a premise that the imaging lens is used with fixed focus, but it may be possible to adopt a configuration in which focus is adjustable. For example, the imaging lens may be configured in such a manner that autofocusing is possible by extending the whole lens system or by moving some lenses on the optical axis. Further, the imaging lens of the present invention may be configured such that, in each lens which is formed in a meniscus shape in the vicinity of the optical axis, a surface with a large absolute value of the radius of curvature of the meniscus shape in the vicinity of the optical axis is set to be planar. In other words, the lens, which is formed in a meniscus shape in the vicinity of the optical axis, may be a plano-convex lens or a plano-concave lens of which a surface with a large absolute value of the radius of curvature of the meniscus shape is planar.

TABLE 1

| EXAMPLE 1 | | | | |
|---|---|---|---|---|
| Si | Ri | Di | Ndj | νdj |
| 1 (APERTURE STOP) | ∞ | −0.204 | | |
| *2 | 1.49799 | 0.663 | 1.54488 | 54.87 |
| *3 | 63.53558 | 0.047 | | |
| *4 | 39.00176 | 0.281 | 1.63351 | 23.63 |
| *5 | 3.24397 | 0.468 | | |
| *6 | −31.71842 | 0.281 | 1.61399 | 25.48 |
| *7 | 16.94688 | 0.308 | | |
| *8 | −2.99111 | 0.709 | 1.54488 | 54.87 |
| *9 | −0.86229 | 0.273 | | |
| *10 | −6.14778 | 0.338 | 1.54488 | 54.87 |
| *11 | 1.36372 | 0.557 | | |
| 12 | ∞ | 0.308 | 1.56700 | 37.80 |
| 13 | ∞ | 0.586 | | |
| 14 | ∞ | | | |

*ASPHERIC SURFACE

TABLE 2

| EXAMPLE 1 • ASPHERIC SURFACE DATA | | | | | |
|---|---|---|---|---|---|
| SURFACE NUMBER | KA | A3 | A4 | A5 | A6 |

TABLE 2-continued

EXAMPLE 1 • ASPHERIC SURFACE DATA

|   |   |   |   |   |   |
|---|---|---|---|---|---|
| 2  | −1.7136755E−01 | −6.7581677E−02 | 6.9832513E−01  | −4.9058974E+00 | 3.3754755E+01  |
| 3  | −2.0116479E+03 | −1.3596379E−01 | 6.3159193E−01  | −1.1304100E+00 | −1.1794215E+00 |
| 4  | −3.3825660E+01 | −4.9588064E−02 | 8.0195692E−02  | −2.2044635E−01 | 8.6573499E+00  |
| 5  | 1.4250017E−01  | 4.5587219E−02  | −4.4856831E−01 | 2.0451999E+00  | −4.1737346E+00 |
| 6  | −8.5440629E+06 | −9.7988410E−02 | 6.0993707E−01  | −3.5492764E+00 | 6.6643543E+00  |
| 7  | 1.8384281E+01  | 1.2797804E−02  | −5.2730745E−01 | 3.5561448E+00  | −2.3089785E+01 |
| 8  | 5.2709733E−01  | −6.4274719E−02 | 1.3337898E−01  | 5.5843763E−01  | −6.2415051E+00 |
| 9  | −2.2232234E−01 | 6.0913229E−03  | 2.8679653E−01  | −7.1300486E−01 | 3.9356918E+00  |
| 10 | −1.9016179E+00 | −1.0297422E−01 | 4.0286330E−01  | −1.1402281E+00 | 2.9814890E+00  |
| 11 | −6.0884334E−03 | 1.0962631E−02  | −8.6423080E−01 | 1.5063886E+00  | −1.9509549E+00 |

|   | A7 | A8 | A9 | A10 | A11 |
|---|---|---|---|---|---|
| 2  | −1.9351551E+02 | 8.2142811E+02  | −2.5139143E+03 | 5.6019836E+03  | −9.1746715E+03 |
| 3  | 7.9236802E+00  | −9.0737950E+00 | −4.1417070E+00 | 1.1135568E+01  | −1.6081787E+00 |
| 4  | −7.7269417E+02 | 3.6874555E+02  | −1.1488123E+03 | 2.5367418E+03  | −4.1061202E+03 |
| 5  | 1.7820187E+00  | 8.2849359E+00  | −1.3693672E+01 | 4.4138082E+00  | 1.7603356E−02  |
| 6  | −2.6948570E+00 | −1.1826905E+01 | 1.9246918E+01  | −4.6215513E+00 | −7.5445912E+00 |
| 7  | 1.0249622E+02  | −3.2829445E+02 | 7.7189714E+02  | −1.3383419E+03 | 1.7046280E+03  |
| 8  | 2.7327163E+01  | −7.7706869E+01 | 1.5926002E+02  | −2.4088766E+02 | 2.6873205E+02  |
| 9  | −1.5808000E+01 | 4.0201415E+01  | −7.1161291E+01 | 9.2219109E+01  | −8.8379855E+01 |
| 10 | −6.7856001E+00 | 1.1977560E+01  | −1.5694404E+01 | 1.4992104E+01  | −1.0320218E+01 |
| 11 | 2.8088238E+00  | −4.1550984E+00 | 4.9292965E+00  | −4.2717179E+00 | 2.6559612E+00  |

|   | A12 | A13 | A14 | A15 | A16 |
|---|---|---|---|---|---|
| 2  | 1.0988746E+04  | −9.3795043E+03 | 5.3948376E+03  | −1.8678202E+03 | 2.9296228E+02  |
| 3  | 1.0424162E+01  | −4.0365013E+01 | 4.3992134E+01  | −1.9289330E+01 | 2.7360196E+00  |
| 4  | 4.8733697E+03  | −4.1258346E+03 | 2.3500231E+03  | −8.0310403E+02 | 1.2379954E+02  |
| 5  | 1.1388246E+01  | −1.2277834E+01 | −3.7072287E+00 | 1.0247387E+01  | −3.8648786E+00 |
| 6  | −6.9891228E+00 | 2.2453523E+01  | −1.5606266E+01 | 3.5770822E+00  | 4.5460492E−02  |
| 7  | −1.5721431E+03 | 1.0193764E+03  | −4.3976632E+02 | 1.1314568E+02  | −1.3118780E+01 |
| 8  | −2.1866720E+02 | 1.2681453E+02  | −4.9961130E+01 | 1.2028805E+01  | −1.3351244E+00 |
| 9  | 6.1746727E+01  | −3.0420613E+01 | 9.9672623E+00  | −1.9426319E+00 | 1.7001489E−01  |
| 10 | 5.0434954E+00  | −1.7026101E+00 | 3.7684312E−01  | −4.9146486E−02 | 2.8609767E−03  |
| 11 | −1.1739890E+00 | 3.6091112E−01  | −7.3490520E−02 | 8.9171564E−03  | −4.8732945E−04 |

TABLE 3

EXAMPLE 2

| Si | Ri | Di | Ndj | νdj |
|---|---|---|---|---|
| 1 (APERTURE STOP) | ∞ | −0.204 | | |
| *2  | 1.46815   | 0.663 | 1.54488 | 54.87 |
| *3  | 7.80000   | 0.047 | | |
| *4  | 35.55561  | 0.281 | 1.63351 | 23.63 |
| *5  | 4.69346   | 0.471 | | |
| *6  | −31.90267 | 0.281 | 1.61399 | 25.48 |
| *7  | 13.81823  | 0.257 | | |
| *8  | −3.31161  | 0.702 | 1.54488 | 54.87 |
| *9  | −0.86653  | 0.292 | | |
| *10 | −8.08175  | 0.333 | 1.54488 | 54.87 |
| *11 | 1.31136   | 0.557 | | |
| 12  | ∞         | 0.308 | 1.56700 | 37.80 |
| 13  | ∞         | 0.504 | | |
| 14  | ∞         |       | | |

*ASPHERIC SURFACE

TABLE 4

EXAMPLE 2 • ASPHERIC SURFACE DATA

| SURFACE NUMBER | KA | A3 | A4 | A5 | A6 |
|---|---|---|---|---|---|
| 2  | −1.7085831E−01 | −6.2889498E−02 | 6.9912586E−01  | −4.9053998E+00 | 3.3756239E+01  |
| 3  | −1.2572978E+03 | −1.1806216E−01 | 6.3723176E−01  | −1.1387155E+00 | −1.1939865E+00 |
| 4  | −1.1824317E+01 | −6.7525323E−02 | 7.2585715E−02  | −2.1715395E−01 | 8.6652836E+00  |
| 5  | −5.7351587E−02 | 5.7142166E−02  | −4.3867252E−01 | 2.0496271E+00  | −4.1722816E+00 |
| 6  | −1.1520109E+07 | −1.0235795E−01 | 6.1298243E−01  | −3.5428145E+00 | 6.6643452E+00  |
| 7  | 2.0567616E+01  | 2.0338887E−02  | −5.2475535E−01 | 3.5556845E+00  | −2.3090696E+01 |
| 8  | 4.6294770E−01  | −6.6262763E−02 | 1.3859617E−01  | 5.6093404E−01  | −6.2408389E+00 |
| 9  | −2.0997709E−01 | 7.7977661E−03  | 2.8161662E−01  | −7.1694642E−01 | 3.9361195E+00  |
| 10 | −2.0866345E+00 | −1.0234140E−01 | 4.0372660E−01  | −1.1400046E+00 | 2.9815252E+00  |
| 11 | −5.5384730E−03 | 1.7270034E−02  | −8.6339750E−01 | 1.5067905E+00  | −1.9508506E+00 |

|   | A7 | A8 | A9 | A10 | A11 |
|---|---|---|---|---|---|
| 2 | −1.9351399E+02 | 8.2142901E+02 | −2.5139137E+03 | 5.6019844E+03 | −9.1746701E+03 |

TABLE 4-continued

EXAMPLE 2 • ASPHERIC SURFACE DATA

|   | | | | | |
|---|---|---|---|---|---|
| 3 | 7.9105453E+00 | −9.0812002E+00 | −4.1422795E+00 | 1.1138861E+01 | −1.6032181E+00 |
| 4 | −7.7253596E+01 | 3.6874601E+02 | −1.1488184E+03 | 2.5367332E+03 | −4.1061299E+03 |
| 5 | 1.7830192E+00 | 8.2870253E+00 | −1.3691103E+01 | 4.4178092E+00 | 2.1962515E−02 |
| 6 | −2.6991306E+00 | −1.1831486E+01 | 1.9241860E+01 | −4.6273549E+00 | −7.5500625E+00 |
| 7 | 1.0249542E+02 | −3.2829502E+02 | 7.7189672E+02 | −1.3383423E+03 | 1.7046276E+03 |
| 8 | 2.7327266E+01 | −7.7706797E+01 | 1.5926012E+02 | −2.4088754E+02 | 2.6873216E+02 |
| 9 | −1.5806584E+01 | 4.0202364E+01 | −7.1160835E+01 | 9.2219270E+01 | −8.8379827E+01 |
| 10 | −6.7855852E+00 | 1.1977567E+01 | −1.5694401E+01 | 1.4992105E+01 | −1.0320218E+01 |
| 11 | 2.8088419E+00 | −4.1550980E+00 | 4.9292954E+00 | −4.2717184E+00 | 2.6559611E+00 |

|   | A12 | A13 | A14 | A15 | A16 |
|---|---|---|---|---|---|
| 2 | 1.0988749E+04 | −9.3795023E+03 | 5.3948385E+03 | −1.8678213E+03 | 2.9295450E+02 |
| 3 | 1.0428845E+01 | −4.0362147E+01 | 4.3990665E+01 | −1.9294192E+01 | 2.7252688E+00 |
| 4 | 4.8733606E+03 | −4.1258404E+03 | 2.3500216E+03 | −8.0309986E+02 | 1.2380897E+02 |
| 5 | 1.1390559E+01 | −1.2275621E+01 | −3.6992299E+00 | 1.0246153E+01 | −3.8758326E+00 |
| 6 | −6.9927710E+00 | 2.2451172E+01 | −1.5603718E+01 | 3.5802007E+00 | 5.0385827E−02 |
| 7 | −1.5721436E+03 | 1.0193758E+03 | −4.3976708E+02 | 1.1314501E+02 | −1.3119466E+01 |
| 8 | −2.1866709E+02 | 1.2681462E+02 | −4.9961065E+01 | 1.2028841E+01 | −1.3350896E+00 |
| 9 | 6.1746712E+01 | −3.0420638E+01 | 9.9672370E+00 | −1.9426521E+00 | 1.7000005E−01 |
| 10 | 5.0434955E+00 | −1.7026102E+00 | 3.7684305E−01 | −4.9146549E−02 | 2.8609184E−03 |
| 11 | −1.1739889E+00 | 3.6091117E−01 | −7.3490494E−02 | 8.9171741E−03 | −4.8732012E−04 |

TABLE 5

EXAMPLE 3

| Si | Ri | Di | Ndj | vdj |
|---|---|---|---|---|
| 1 (APERTURE STOP) | ∞ | −0.204 | | |
| *2 | 1.48458 | 0.677 | 1.54488 | 54.87 |
| *3 | 13.00000 | 0.047 | | |
| *4 | 28.16279 | 0.283 | 1.63351 | 23.63 |
| *5 | 3.72167 | 0.470 | | |
| *6 | −36.43504 | 0.287 | 1.61399 | 25.48 |
| *7 | 19.38948 | 0.303 | | |
| *8 | −3.01787 | 0.703 | 1.54488 | 54.87 |
| *9 | −0.86403 | 0.273 | | |
| *10 | −6.32147 | 0.364 | 1.54488 | 54.87 |
| *11 | 1.33190 | 0.557 | | |
| 12 | ∞ | 0.308 | 1.56700 | 37.80 |
| 13 | ∞ | 0.510 | | |
| 14 | ∞ | | | |

*ASPHERIC SURFACE

TABLE 6

EXAMPLE 3 • ASPHERIC SURFACE DATA

| SURFACE NUMBER | KA | A3 | A4 | A5 | A6 |
|---|---|---|---|---|---|
| 2 | −1.7782156E−01 | −6.8826849E−02 | 6.9779290E−01 | −4.9058778E+00 | 3.3755222E+01 |
| 3 | −1.9480720E+03 | −1.3390929E−01 | 6.3294741E−01 | −1.1298092E+00 | −1.1794903E+00 |
| 4 | −5.1041130E+01 | −5.1923298E−02 | 7.8505267E−02 | −2.2137331E−01 | 8.6571778E+00 |
| 5 | 1.5943791E−01 | 5.0244951E−02 | −4.4433446E−01 | 2.0482621E+00 | −4.1722364E+00 |
| 6 | −1.1555679E+07 | −1.0243281E−01 | 6.0759897E−01 | −3.5504299E+00 | 6.6641721E+00 |
| 7 | 1.5260374E+01 | 1.4840789E−02 | −5.2709696E−01 | 3.5555155E+00 | −2.3090905E+01 |
| 8 | 5.2752229E−01 | −6.5461871E−02 | 1.3377813E−01 | 5.5904033E−01 | −6.2412366E+00 |
| 9 | −2.1926555E−01 | 6.8567718E−03 | 2.8567717E−01 | −7.1405371E−01 | 3.9352317E+00 |
| 10 | −1.8794301E+00 | −1.0327202E−01 | 4.0326370E−01 | −1.1400402E+00 | 2.9815630E+00 |
| 11 | −6.6138407E−03 | 1.2967763E−02 | −8.6409839E−01 | 1.5063932E+00 | −1.9509647E+00 |

|   | A7 | A8 | A9 | A10 | A11 |
|---|---|---|---|---|---|
| 2 | −1.9351474E+02 | 8.2142906E+02 | −2.5139133E+03 | 5.6019846E+03 | −9.1746707E+03 |
| 3 | 7.9231110E+00 | −9.0747092E+00 | −4.1428303E+00 | 1.1134401E+01 | −1.6092018E+00 |
| 4 | −7.7258980E+01 | 3.6874646E+02 | −1.1488111E+03 | 2.5367431E+03 | −4.1061190E+03 |
| 5 | 1.7817881E+00 | 8.2829414E+00 | −1.3697300E+01 | 4.4091365E+00 | 1.2947379E−02 |
| 6 | −2.6939549E+00 | −1.1826965E+01 | 1.9245515E+01 | −4.6267131E+00 | −7.5529588E+00 |
| 7 | 1.0249533E+02 | −3.2829496E+02 | 7.7189684E+02 | −1.3383421E+03 | 1.7046279E+03 |
| 8 | 2.7327201E+01 | −7.7706900E+01 | 1.5925998E+02 | −2.4088768E+02 | 2.6873205E+02 |
| 9 | −1.5808178E+01 | 4.0201332E+01 | −7.1161338E+01 | 9.2219078E+01 | −8.8379875E+01 |
| 10 | −6.7855706E+00 | 1.1977572E+01 | −1.5694399E+01 | 1.4992106E+01 | −1.0320217E+01 |
| 11 | 2.8088172E+00 | −4.1551012E+00 | 4.9292956E+00 | −4.2717180E+00 | 2.6559612E+00 |

|   | A12 | A13 | A14 | A15 | A16 |
|---|---|---|---|---|---|
| 2 | 1.0988746E+04 | −9.3795040E+03 | 5.3948375E+03 | −1.8678209E+03 | 2.9296085E+02 |
| 3 | 1.0423502E+01 | −4.0365076E+01 | 4.3992727E+01 | −1.9288170E+01 | 2.7374210E+00 |

TABLE 6-continued

EXAMPLE 3 • ASPHERIC SURFACE DATA

| | | | | | |
|---|---|---|---|---|---|
| 4 | 4.8733704E+03 | −4.1258346E+03 | 2.3500222E+03 | −8.0310561E+02 | 1.2379759E+02 |
| 5 | 1.1384749E+01 | −1.2279410E+01 | −3.7066537E+00 | 1.0250071E+01 | −3.8604308E+00 |
| 6 | −6.9993274E+00 | 2.2442555E+01 | −1.5616885E+01 | 3.5672499E+00 | 3.7025774E−02 |
| 7 | −1.5721433E+03 | 1.0193762E+03 | −4.3976658E+02 | 1.1314538E+02 | −1.3119108E+01 |
| 8 | −2.1866720E+02 | 1.2681453E+02 | −4.9961128E+01 | 1.2028806E+01 | −1.3351231E+00 |
| 9 | 6.1746715E+01 | −3.0420620E+01 | 9.9672582E+00 | −1.9426341E+00 | 1.7001383E−01 |
| 10 | 5.0434958E+00 | −1.7026099E+00 | 3.7684323E−01 | −4.9146421E−02 | 2.8610189E−03 |
| 11 | −1.1739888E+00 | 3.6091120E−01 | −7.3490473E−02 | 8.9171830E−03 | −4.8731532E−04 |

TABLE 7

EXAMPLE 4

| Si | Ri | Di | Ndj | ν dj |
|---|---|---|---|---|
| 1 (APERTURE STOP) | ∞ | −0.205 | | |
| *2 | 1.44273 | 0.663 | 1.54488 | 54.87 |
| *3 | 30.61574 | 0.047 | | |
| *4 | 13.34462 | 0.281 | 1.63351 | 23.63 |
| *5 | 2.84036 | 0.468 | | |
| *6 | −32.90528 | 0.300 | 1.61399 | 25.48 |
| *7 | 13.02737 | 0.273 | | |
| *8 | −2.41452 | 0.702 | 1.54488 | 54.87 |
| *9 | −1.04000 | 0.351 | | |
| *10 | −9.75011 | 0.395 | 1.54488 | 54.87 |
| *11 | 2.46983 | 0.557 | | |
| 12 | ∞ | 0.308 | 1.56700 | 37.80 |
| 13 | ∞ | 0.514 | | |
| 14 | ∞ | | | |

*ASPHERIC SURFACE

TABLE 8

EXAMPLE 4 • ASPHERIC SURFACE DATA

| SURFACE NUMBER | KA | A3 | A4 | A5 | A6 |
|---|---|---|---|---|---|
| 2 | −2.5129599E−02 | −7.7483797E−02 | 7.5839636E−01 | −5.0547213E+00 | 3.3883321E+01 |
| 3 | −2.0559632E+03 | −1.3517343E−01 | 6.4869594E−01 | −1.1802514E+00 | −1.2178931E+00 |
| 4 | −1.2286080E+01 | −6.1558626E−02 | 1.6121805E−01 | −3.8004262E−01 | 8.7255396E+00 |
| 5 | 1.4978786E−01 | 5.3958015E−02 | −4.4119270E−01 | 2.0506983E+00 | −4.1090198E+00 |
| 6 | −8.5441125E+06 | −1.1423387E−01 | 6.5897492E−01 | −3.3971516E+00 | 6.5944516E+00 |
| 7 | 1.7480380E+01 | 1.8668411E−02 | −5.4001714E−01 | 3.6071382E+00 | −2.3007281E+01 |
| 8 | 5.1031306E−01 | −7.6888400E−02 | 4.1128679E−02 | 5.0566435E−01 | −6.1380260E+00 |
| 9 | −2.1197286E−01 | −1.5466354E−01 | 3.9740014E−02 | −8.3190323E−01 | 3.9681151E+00 |
| 10 | −1.9901188E+00 | −9.5625720E−02 | 4.0436516E−01 | −1.1445096E+00 | 2.9824088E+00 |
| 11 | −3.9996638E−01 | 2.6231146E−01 | −9.1188759E−01 | 1.5142866E+00 | −1.9405733E+00 |

| | A7 | A8 | A9 | A10 | A11 |
|---|---|---|---|---|---|
| 2 | −1.9348512E+02 | 8.2139456E+02 | −2.5139822E+03 | 5.6018511E+03 | −9.1744329E+03 |
| 3 | 8.0153271E+00 | −8.9091898E+00 | −4.4406342E+00 | 1.1198507E+01 | −1.5426975E+00 |
| 4 | −7.7165532E+01 | 3.6883599E+02 | −1.1490553E+03 | 2.5368858E+03 | −4.1061098E+03 |
| 5 | 1.7788519E+00 | 8.3403789E+00 | −1.3960354E+01 | 4.6850974E+00 | 3.1861085E−01 |
| 6 | −2.9439391E+00 | −1.1496948E+01 | 1.9358676E+01 | −4.8117065E+00 | −7.5709122E+00 |
| 7 | 1.0246321E+02 | −3.2832497E+02 | 7.7187254E+02 | −1.3383188E+03 | 1.7046632E+03 |
| 8 | 2.7260121E+01 | −7.7671428E+01 | 1.5922368E+02 | −2.4084471E+02 | 2.6872889E+02 |
| 9 | −1.5804993E+01 | 4.0194855E+01 | −7.1164288E+01 | 9.2222865E+01 | −8.8384906E+01 |
| 10 | −6.7863016E+00 | 1.1977779E+01 | −1.5694918E+01 | 1.4992222E+01 | −1.0319961E+01 |
| 11 | 2.8090330E+00 | −4.1561288E+00 | 4.9289611E+00 | −4.2717352E+00 | 2.6560398E+00 |

| | A12 | A13 | A14 | A15 | A16 |
|---|---|---|---|---|---|
| 2 | 1.0988695E+04 | −9.3793911E+03 | 5.3946389E+03 | −1.8677649E+03 | 2.9296480E+02 |
| 3 | 1.0383227E+01 | −4.0140457E+01 | 4.3669715E+01 | −1.9250470E+01 | 2.8096509E+00 |
| 4 | 4.8733371E+03 | −4.1257663E+03 | 2.3498585E+03 | −8.0314591E+02 | 1.2391292E+02 |
| 5 | 1.1112778E+01 | −1.2673989E+01 | −3.0853121E+00 | 9.9270765E+00 | −3.7573645E+00 |
| 6 | −6.9118379E+00 | 2.2199749E+01 | −1.5208167E+01 | 3.5936630E+00 | −1.8680240E−01 |
| 7 | −1.5721360E+03 | 1.0193678E+03 | −4.3979067E+02 | 1.1312791E+02 | −1.3107072E+01 |
| 8 | −2.1867790E+02 | 1.2681282E+02 | −4.9959734E+01 | 1.2029890E+01 | −1.3314366E+00 |
| 9 | 6.1745498E+01 | −3.0419220E+01 | 9.9691247E+00 | −1.9420591E+00 | 1.6896864E−01 |
| 10 | 5.0434429E+00 | −1.7025919E+00 | 3.7682630E−01 | −4.9153746E−02 | 2.8643891E−03 |
| 11 | −1.1739827E+00 | 3.6091529E−01 | −7.3491893E−02 | 8.9156079E−03 | −4.8696699E−04 |

TABLE 9

VALUES IN CONDITIONAL EXPRESSIONS

| | EXPRESSION NUMBER | EXAMPLE 1 | EXAMPLE 2 | EXAMPLE 3 | EXAMPLE 4 |
|---|---|---|---|---|---|
| f | | 4.050 | 3.817 | 3.963 | 4.019 |
| Bf | | 1.346 | 1.262 | 1.268 | 1.267 |
| FNo. | | 2.40 | 2.40 | 2.40 | 2.40 |
| 2ω | | 70.8° | 73.8° | 72.8° | 69.8° |
| L | | 4.714 | 4.589 | 4.675 | 4.747 |
| f1 | | 2.805 | 3.201 | 3.013 | 2.757 |
| f2 | | −5.601 | −8.565 | −6.799 | −5.756 |
| f3 | | −17.949 | −15.666 | −20.570 | −15.162 |
| f4 | | 1.990 | 1.956 | 1.992 | 2.841 |
| f5 | | −2.015 | −2.044 | −1.985 | −3.576 |
| f/f5 | 1 | −2.007 | −1.865 | −1.995 | −1.124 |
| f/f4 | 2 | 2.035 | 1.952 | 1.989 | 1.415 |

What is claimed is:

1. An imaging lens consisting of, in order from an object side, five lenses of:
   a first lens that has a positive refractive power and has a meniscus shape which is concave toward an image side;
   a second lens that has a negative refractive power and has a meniscus shape which is concave toward the image side;
   a third lens that has a biconcave shape;
   a fourth lens that has a positive refractive power and has a meniscus shape which is convex toward the image side; and
   a fifth lens that has a biconcave shape and has an aspheric shape which has at least one extreme point on an image side surface,
   wherein the following conditional expression (1-2) is satisfied:

$$-2.01 < f/f5 < -1.12 \quad (1\text{-}2),$$

where
   f is a focal length of a whole system, and
   f5 is a focal length of the fifth lens.

2. The imaging lens, as defined in claim 1, wherein an image side surface of the third lens has an aspheric shape which has at least one extreme point, an intersection point between the image side surface of the third lens and a principal ray with a maximum angle of view is positioned on the object side of an intersection point between the image side surface of the third lens and an optical axis, and an intersection point between an object side surface of the third lens and the principal ray with the maximum angle of view is positioned on the object side of an intersection point between the object side surface of the third lens and the optical axis.

3. The imaging lens, as defined in claim 1, wherein the following conditional expression is further satisfied:

$$0 < f/f4 < 3 \quad (2),$$

where
   f4 is a focal length of the fourth lens.

4. The imaging lens, as defined in claim 3, wherein the following conditional expression is further satisfied:

$$0.7 < f/f4 < 2.5 \quad (2\text{-}1).$$

5. An imaging lens consisting of, in order from an object side, five lenses of:
   a first lens that has a positive refractive power and has a meniscus shape which is concave toward an image side;
   a second lens that has a negative refractive power and has a meniscus shape which is concave toward the image side;
   a third lens that has a biconcave shape;
   a fourth lens that has a positive refractive power and has a meniscus shape which is convex toward the image side; and
   a fifth lens that has a biconcave shape and has an aspheric shape which has at least one extreme point on an image side surface,
   wherein the following conditional expression (1) is satisfied:

$$-2.127 < f/f5 < 0 \quad (1),$$

where
   f is a focal length of a whole system, and
   f5 is a focal length of the fifth lens, and
   wherein the following conditional expression (2-2) is further satisfied:

$$1.4 < f/f4 < 2.1 \quad (2\text{-}2),$$

where
   f4 is a focal length of the fourth lens.

6. The imaging lens, as defined in claim 1, wherein the following conditional expression is further satisfied:

$$|f2| < |f3| \quad (3),$$

where
   f2 is a focal length of the second lens, and
   f3 is a focal length of the third lens.

7. The imaging lens, as defined in claim 1, further comprising an aperture stop that is disposed on the object side of an object side surface of the second lens.

8. An imaging apparatus comprising:
   the imaging lens, as defined in claim 1.

9. The imaging lens, as defined in claim 5, wherein an image side surface of the third lens has an aspheric shape which has at least one extreme point, an intersection point between the image side surface of the third lens and a principal ray with a maximum angle of view is positioned on the object side of an intersection point between the image side surface of the third lens and an optical axis, and an intersection point between an object side surface of the third lens and the principal ray with the maximum angle of view is positioned on the object side of an intersection point between the object side surface of the third lens and the optical axis.

10. The imaging lens, as defined in claim 5, wherein the following conditional expression is further satisfied:

$$-2.06 < f/f5 < -0.56 \quad (1\text{-}1).$$

11. The imaging lens, as defined in claim 10, wherein the following conditional expression is further satisfied:

$$-2.01 < f/f5 < -1.12 \quad (1\text{-}2).$$

12. The imaging lens, as defined in claim 5, wherein the following conditional expression is further satisfied:

$$|f2| < |f3| \quad (3),$$

where
    f2 is a focal length of the second lens, and
    f3 is a focal length of the third lens.

13. The imaging lens, as defined in claim 5, further comprising an aperture stop that is disposed on the object side of an object side surface of the second lens.

* * * * *